United States Patent
Cline (10) Patent No.: US 9,733,654 B2
(45) Date of Patent: Aug. 15, 2017

(54) DUAL FUNCTIONAL TEMPERATURE CONTROL SYSTEM APPLICATOR SYSTEM

(76) Inventor: William A. Cline, Romeo, MI (US)

( * ) Notice: Subject to any disclaimer, the term of this patent is extended or adjusted under 35 U.S.C. 154(b) by 211 days.

(21) Appl. No.: 13/388,802

(22) PCT Filed: Aug. 4, 2010

(86) PCT No.: PCT/US2010/044425
§ 371 (c)(1),
(2), (4) Date: Feb. 3, 2012

(87) PCT Pub. No.: WO2011/017438
PCT Pub. Date: Feb. 10, 2011

(65) Prior Publication Data
US 2012/0125016 A1 May 24, 2012

Related U.S. Application Data

(60) Provisional application No. 61/231,136, filed on Aug. 4, 2009.

(51) Int. Cl.
G05D 23/19 (2006.01)
F28D 21/00 (2006.01)
B05C 11/10 (2006.01)

(52) U.S. Cl.
CPC ...... *G05D 23/1919* (2013.01); *B05C 11/1042* (2013.01); *B05C 11/1002* (2013.01); *F28D 2021/0077* (2013.01)

(58) Field of Classification Search
CPC . F25B 21/02; F25B 29/00; F28F 27/00; F28F 27/02

(Continued)

(56) References Cited

U.S. PATENT DOCUMENTS 4,308,013 A 12/1981 Major
4,520,305 A 5/1985 Cauchy
(Continued)

FOREIGN PATENT DOCUMENTS

JP 4321113 A 11/1992

OTHER PUBLICATIONS

International Search Report and The Written Opinion of the International Searching Authority mailed on Mar. 14, 2011 for International Application No. PCT/US2010/044425 filed Aug. 4, 2010.

(Continued)

*Primary Examiner* — Elizabeth Martin
*Assistant Examiner* — Zachary R Anderegg
(74) *Attorney, Agent, or Firm* — Young Basile PC (57) ABSTRACT

A temperature control system for dispensing a fluid material from an applicator nozzle at a controlled temperature that includes at least one temperature control fluid conduit at least one fluid material supply conduit and at least one manifold device. The manifold device is in thermal communication with the temperature control fluid conduit and the fluid conduit and may also be in thermal communication with the fluid material supply conduit. At least one thermal adjustment device is in thermal contact with the manifold device. The thermal adjustment device includes at least one thermoelectric device such as at least one peltier circuit. The temperature control system also includes at least one sensor positioned proximate to the applicator nozzle that produces at least one signal actionable on the Peltier circuit device.

8 Claims, 4 Drawing Sheets

(58) Field of Classification Search
USPC .................. 62/3.64, 3.7; 222/146.1, 592, 23
See application file for complete search history.

(56) References Cited

U.S. PATENT DOCUMENTS

| | | | |
|---|---|---|---|
| 4,873,830 A | | 10/1989 | Blattler |
| 4,998,502 A * | | 3/1991 | Schucker ..................... 118/667 |
| 5,287,913 A | | 2/1994 | Dunning et al. |
| 5,301,508 A * | | 4/1994 | Kahl et al. ..................... 62/3.62 |
| 5,363,907 A * | | 11/1994 | Dunning et al. ................ 165/46 |
| 6,782,195 B2 * | | 8/2004 | Abras ..................... F24H 1/162 |
| | | | 165/148 |
| 2004/0098991 A1 * | | 5/2004 | Heyes ............................ 62/3.64 |
| 2007/0056295 A1 * | | 3/2007 | De Vilbiss ..................... 62/3.64 |
| 2011/0045152 A1 * | | 2/2011 | Stutz et al. ................... 426/433 |

OTHER PUBLICATIONS

International Preliminary Report on Patentability mailed on Feb. 16, 2012 for International Application No. PCT/US2010/044425 filed Aug. 4, 2010.

* cited by examiner

DUAL FUNCTIONAL TEMPERATURE CONTROL SYSTEM APPLICATOR SYSTEM

The present application is a national stage entry from PCT/US10/44425 filed Aug. 4, 2010 which claims priority to U.S. Provisional Application No. 61/231,136 filed Aug. 4, 2009, the specification of which is incorporated by reference herein.

The present invention relates to temperature controls for hose assemblies.

There are many industrial applications (for example the manufacture of devices such as motor vehicles) where it is necessary to provide material application within specific temperature controls. For example, many assembly processes require dispensing a bead of material for application to a surface of a part to facilitate the attachment of the part to other parts. The material to be applied may have temperature-dependant qualities that include, but are not limited to, properties such as viscosity and the like. The material to be applied can be contained in any suitable reservoir or material source and can be supplied to the applicator nozzle by means of suitable pumps and the like.

In many application procedures, the applicator nozzle is mounted distal to the pump such as on a suitable robotic arm that can be oriented as desired or required, to accomplish the desired application routine. In various applications, a system is provided that includes a pump device supplying material. The material to be applied to a nozzle which may, for example, be mounted on a robot so as to allow the nozzle to be movable by the robot in any desired motion program so as to apply a predetermined application pattern. In order for such systems to operate successfully, it is important that the temperature-dependeant characteristics of the material be carefully controlled at all times so as to provide a desired and preprogrammed flow of the material and/or adhesion of the material onto the surface of the part. Control of the rate of flow and/or the adhesion rate for the material involves, among other parameters, control of the temperature of the material. Whereas various temperature control systems have been proposed to control the temperature of the material flowing between the pump and the nozzle, the various temperature control systems are either ineffective to precisely control the temperature and temperature dependant properties of the material and/or are unduly complicated and unduly expensive.

Various temperature control systems that have been proposed to date are not configured to permit upward and/or downward adjustment of the temperature of the material to be dispensed through the applicator nozzle, particularly in various dead head application configurations.

SUMMARY

This invention is directed to the provision of an improved temperature control system for hose assembly applicator system configured to dispense materials such as adhesives and the like.

Disclosed herein is a temperature control system for dispensing a fluid material from an applicator nozzle at a controlled temperature. The temperature control system includes at least one temperature control fluid conduit containing a temperature control fluid that is associated with at least one fluid material supply conduit. The temperature control system also includes at least one manifold device in communication with the temperature control fluid conduit and the fluid material supply conduit. At least one thermal adjustment device is in thermal contact with the manifold device and includes at least one thermoelectric temperature regulator such as at least one peltier circuit device. The at least one temperature control fluid condiut projects from the manifold device toward the applicator nozzle and the temperature control fluid recirculates from the manifold device to a location proximate to the applicator nozzle and back to the at least one manifold device.

The temperature control system also includes at least one control device and at least one sensor positioned proximate to the applicator nozzle outlet orifice. The sensor produces at least one signal actionable on the peltier circuit device provides output to the control device.

The one manifold device has a central body with an outer surface and at least one serpentine temperature control fluid channel defined therein. The serpentine temperature control fluid channel being in fluid communicates with the temperature control fluid conduit and is configured to convey the liquid temperature control fluid passing through the temperature control fluid conduit. The manifold device also includes at least one serpentine process fluid material channel in fluid communication with the process fluid material supply conduit configured to convey the process fluid material passing through the process fluid material supply conduit. The serpentine temperature control fluid channel and the at least one serpentine process fluid material channel are in side-by-side relationship with one another.

The at least one peltier circuit is positioned on the outer surface of the central body of the manifold device at a location proximate to the temperature control fluid channel. The temperature control system also includes at least one additional peltier circuit device positioned on the outer surface of the manifold device proximate to the at least one serpintine process fluid material channel.

At least one sensor is positioned proximate to the applicator nozzle. The sensor produces at least one signal readable by a suitable control device and actionable on the thermoelectric temperature regulator. The signal derives from temperature readings taken proximate to the applicator nozzle.

BRIEF DESCRIPTION OF THE DRAWINGS

The description herein makes reference to the accompanying drawings wherein like reference numerals refer to like parts throughout the several views, and wherein.

DETAILED DESCRIPTION

Disclosed herein is a dual temperature control system for use in the application of temperature controlled fluid material to a surface as well as an application device for delivering temperature controlled fluid material. The application device can be of any suitable configuration and can include a means for conveying the fluid material to an application nozzle. Where desired or required, the application nozzle can be mounted on a suitable device such as a robotic arm. Where desired or required, the application device can have a central fluid temperature adjustment mechanism capable of achieving gross temperature control of the material to be applied.

It is contemplated that the dual control temperature device can be employed with a variety of robotic and non-robotic applicator systems and devices. One nonlimiting example of such systems is described in U.S. Pat. No. 5,363,907 to Dunning et al., the specification of which is incorporated by reference herein.

The device disclosed herein can be employed in combination with the aforementioned apparatus. It is also contemplated that the device disclosed herein may have applications in temperature regulation procedures for fluid application that are independent of any central fluid temperature adjustment systems.

The dual functional temperature control system for delivering fluid application material to an applicator nozzle at a controlled temperature, as broadly construed, includes at least one temperature control fluid conduit that can be associated with at least one conduit conveying fluid application material. The device has at least one thermal transfer element such as a manifold device in fluid communication with the temperature control fluid conduit. The device also includes at least one thermoelectric element releasably connected to the thermal transfer device in various embodiments. The thermoelectric device can be a peltier circuit and can be configured to provide positive or negative thermal transfer as desired or required. At least one sensor is positioned proximate to the applicator nozzle. The sensor is configured to produce at least one signal actionable on the thermoelectric device.

Figure 1:
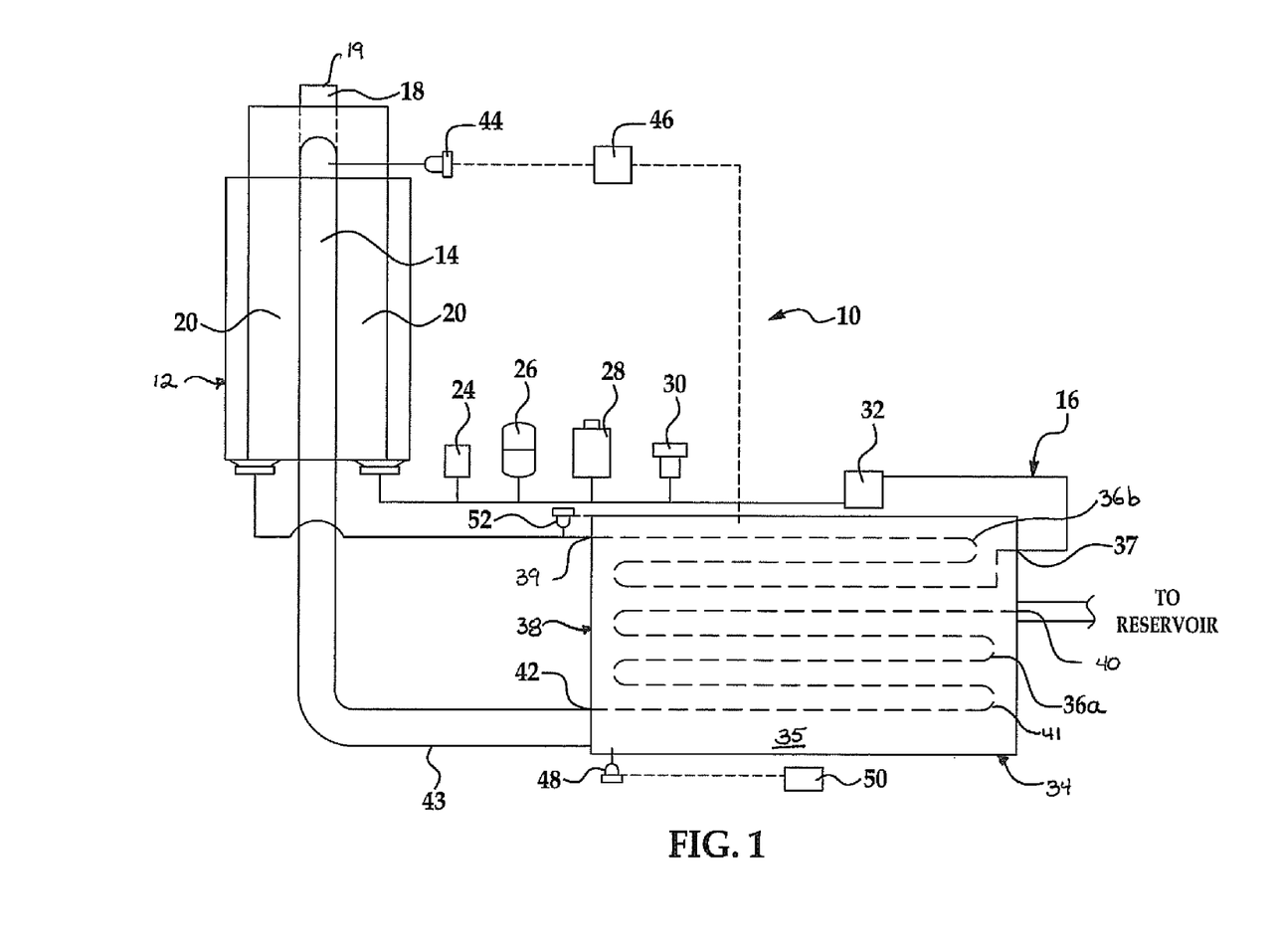
FIG. 1 is a schematic diagram of a temperature control system according to an embodiment as disclosed herein.

An embodiment of the dual control temperature control device and system as disclosed herein is set forth in FIG. 1. As depicted in FIG. 1, the device 10 is associated with an application device 12 having a least one device central material conveying or supply conduit 14 configured to convey and dispense at least one material for application to a suitable end point such as a substrate or the like. The application device 12 can have any suitable configuration. In many situations, it is contemplated that the application device will be robotically activated. Suitable application devices will have at least one central process fluid material conveying or supply channel or supply conduit 14 terminating in a applicator nozzle 18.

It is contemplated that the dual control temperature device can be integrated into a suitable applicator device by either initial manufacture or retrofit.

The applicator nozzle 18 may have any suitable configuration. Where desired or required, the flow of material through the central process fluid material conveying or supply conduit 14 and associated applicator nozzle 18 can be governed by suitable regulators (not shown). The regulators can include various pumps, values, and the like that can increase, reduce, or start and stop the material flow through the nozzle. In the embodiment as depicted in FIG. 1, the material to be applied can be a fluid or fluidizable material such as an adhesive or the like. It is contemplated that the fluid material to be applied can be composed of one or more parts that can be introduced into the central process fluid material conveying or supply conduit 14 in a manner such as that to be described subsequently.

The device 10 disclosed herein includes a thermal transfer element 16. In the embodiment depicted in FIG. 1, thermal transfer element 16 is a fluid circuit that is associated with the application device 12 configured with the central process fluid material conveying or supply conduit 14 and applicator nozzle 18. The thermal transfer element 16 contains a suitable temperature transfer fluid that can circulate through the thermal fluid circuit and is configured with suitable means to accomplish such fluid circulation.

It is contemplated that the temperature control fluid can be any suitable material capable of maintaining, and/or moderating the temperature of the applied material. Suitable temperature control fluids include, but are not limited to, liquid materials such as water various organic fluid, and the like. It is contemplated that where desired or required the liquid temperature control fluid such as water or organic fluids can include suitable additives. Non-limiting examples of such additives include viscosity modifiers, temperature stabilizers, corrosion inhibitors and the like.

It is contemplated that the temperature regulating fluid passing through the thermal fluid circuit defined by the thermal transfer element 16 can be recirculated in a continuous loop as desired or required. The thermal fluid circuit and associated thermal transfer element 16 can include suitable conduits, including temperature control fluid conduit 20, as well as various devices to facilitate circulation and recirculation of the temperature regulating fluid. In the embodiment depicted, suitable devices include, but need not be limited to, pressure switches 24, expansion tanks 26, make-up fluid reservoirs 28, and pressure relief valves 30. The circuit can also include at least one suitable recirculating pump(s) 32. The recirculating pump(s) 32 can be configured to permit the recirculating fluid to be defined by thermal transfer element 16 continuously recirculated through the circuit defined by thermal transfer element 16 providing thermal transfer and temperature conditioning to the region in application device 12 associated with process fluid material conveying or supply conduit 14 and applicator nozzle 18.

At least a portion of the temperature control fluid conduit 20 is configured to be positioned or positionable in thermal contact with the process fluid material conveying or supply conduit 14 and applicator nozzle 18. The temperature control fluid conduit 20 can be positioned in thermal contact with application device 12 by any suitable means. One nonlimiting example of such placement or positioning means are various trace cover assemblies such as those discussed in U.S. Pat. Nos. 5,287,913 and 5,363,907 to Dunning et al., the specification of which is incorporated by reference herein. Suitable placement or positioning means will generally include a jacket that surrounds the process fluid material conveying or supply conduit 14 and any associated temperature control fluid conduits.

The device 10 also includes a suitable thermal transfer device such as heat transfer device 34 positioned in the fluid circuit defined by thermal transfer element 16. The thermal transfer device 34 is configured to adjust and condition the temperature of the temperature control fluid based upon prescribed inputs. The thermal transfer device 34 will include suitable structure(s) to facilitate thermal transfer to and/or from materials such as the thermal transfer fluid. One non-limiting example of such structure(s) is a fluid manifold such as manifold device 36. The manifold device 36 is in thermal contact with at least one thermoelectric device 38. The thermoelectric device 38 employed can be any suitable device capable of facilitating the transfer of thermal energy to and/or from the manifold device 36 and the material(s) passing therethrough.

Figure 2:
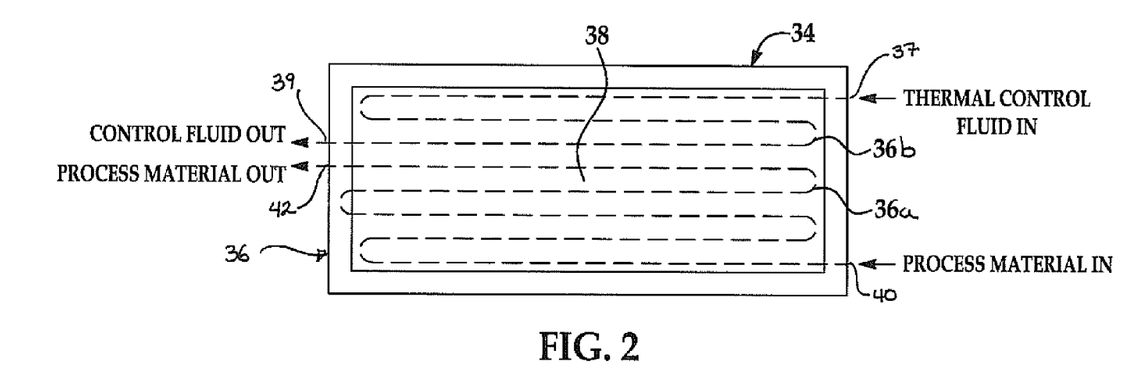
FIG. 2 is an alternate configuration of the thermal transfer element of the temperature control system of FIG. 1.
Figure 3:
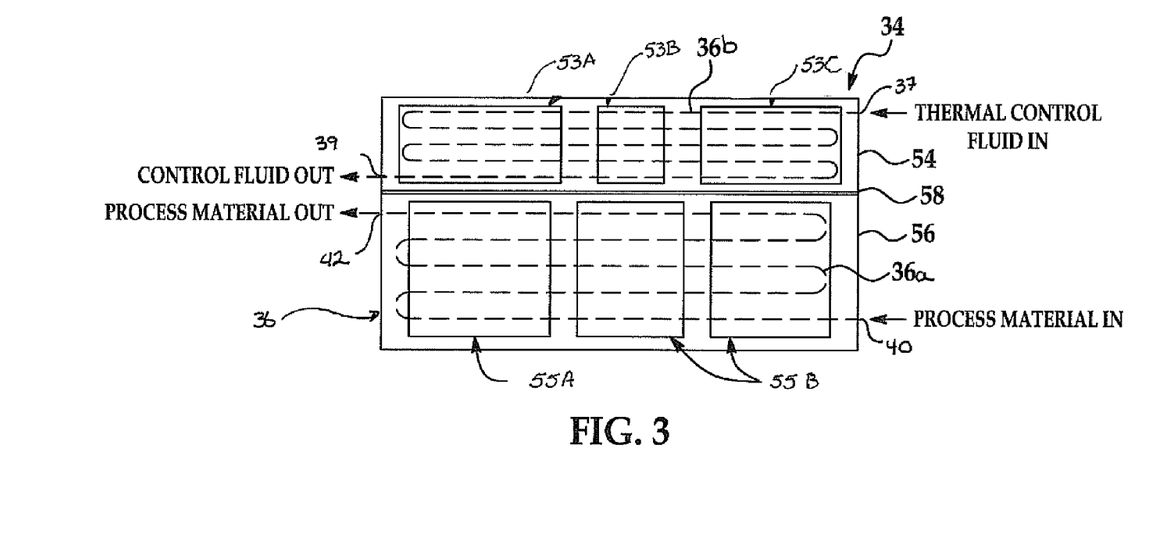
FIG. 3 is an alternate configuration of the thermal transfer element of the temperature control system of FIG. 1.

The manifold device 36 as depicted in FIG. 1 includes a central body 33 having at least one outer surface and has at least one temperature control fluid inlet 37 and at least one temperature control fluid outlet 39 connected to one another by a temperature control fluid conveying channel 36b defined in the central body. The thermal energy of the temperature control fluid transiting the manifold device 36 can be raised or lowered based upon control of the operational function of the thermoelectric device 38 as depicted in FIGS. 2 and 3.

The temperature control fluid can be routed through the temperature control fluid conduit 20 proximate to the process fluid material conveying or supply conduit 14. The respective conduits such as supply conduit 14 and temperature control fluid conduit 20 are positioned in sufficient proximity one another to achieve thermal communication therebetween. It is contemplated that the thermal transfer device such as heat transfer device 34 can be configured to be the sole means of temperature adjustment for the temperature adjustment fluid. It is also considered to be within the purview of this disclosure to utilize additional temperature adjustment devices in tandem with the thermal transfer device such as heat transfer device 34.

As depicted in FIG. 1, the thermal transfer element 34 also includes means for conditioning the temperature of fluid material to be dispensed from the applicator nozzle 18. Such material temperature conditioning means can be configured to function in tandem side-by-side manner with the temperature conditioning means for the temperature control fluid.

In the embodiment depicted in FIG. 1, the manifold device 36 is configured with a thermal transfer channel 36b for the process fluid material that includes at least one process fluid material inlet such as process fluid material inlet 40 and at least one process fluid material outlet such as process fluid material outlet 42. It is contemplated that the process fluid material inlet 40 can be in fluid communication with any suitable fluid material reservoir or the like (not shown). As depicted, the process fluid material outlet 42 is in fluid communication with any suitable conduit 43 communicating with the process fluid material conveying or supply conduit 14. Process fluid material entering the manifold device 36 can be subjected to temperature conditioning prior to entry into the heat transfer device 34 by any suitable means as desired or required (not shown). It is also contemplated that in many applications and embodiments, the heat transfer device 34 can be configured to provide the thermal conditioning necessary for application of the process material through the applicator nozzle 18 of application device 12.

Where desired or required, the manifold device 36 can be configured to provide multiple passes prior to exit of the respective process fluid material or temperature control fluid. In certain embodiments, for instance, it is contemplated that the temperature control fluid will be subject to two or three passes, while the process fluid material to be applied is subjected to four or more passes. This can be accomplished by at least one serpentine process fluid material channel 36a that is defined in the manifold device 36. Thus, it can be appreciated that the residence time of the respective materials in the manifold device 36 can be varied to ensure efficient and effective heat transfer. It is also contemplated that the size or surface area of the respective conduits within the manifold device 36 can be independently variable in order to assure proper transit of the respective material or fluid and to enable or promote heat transfer. The manifold device 36 can also include at least one serpentine temperature control fluid channel 36b.

The dual functional temperature control device 10 as disclosed herein also includes means for monitoring temperature of the fluid material as it exits the applicator nozzle 18. Such monitoring means can include a suitable sensor or sensors 44 located proximate to the outlet orifice 19 of applicator nozzle 18. The sensor 44 can be configured to provide suitable output regarding the temperature of the fluid material as dispensed. The sensor 44 can communicate with suitable control devices such as temperature controller 46 configured to provide output commands actionable on the thermoelectric device(s) 38 associated with heat transfer device 34 to regulate or adjust the physical properties of the fluid material(s) as they pass through the heat transfer device 34. Suitable properties include, but need not be limited to, material temperature as well as temperature dependent properties such as viscosity and, in the case of multi-part reactive components reaction rate.

It is contemplated that temperature data obtained from sensor 44 can be outputted to a suitable control device and the resulting commands actionable on the thermoelectric device or devices 38 associated with heat transfer device 34. Depending upon the temperature data and desired operating parameters, the thermoelectric device 38 can be operated to either introduce thermal energy to the heat transfer device 34 or remove thermal energy form the unit, i.e. either heat or cool the heat transfer device 34 and material passing therethrough.

Operation of the thermoelectric device 38 can be governed and moderated by suitable control parameters and devices as desired or required with the thermal output of the thermoelectric device 38 being actionable on either the thermal energy of the temperature transfer fluid, the process material to be dispensed or both. In the embodiment depicted in FIG. 1, the device 10 has a single thermoelectric device 38 in thermal contact with a manifold device 36 configured to provide conditioning for both temperature control fluid and material to be dispensed transiting therethrough. In such configurations, it is contemplated that the temperature of the material to be dispensed can be carefully adjusted either positively or negatively directly based upon the action of the heat transfer device 34 and the action of conditioned temperature control fluid transiting thermal transfer element 16.

Where desired or required, it is contemplated that the device 10 can include an additional one or more sensor(s) such as manifold output sensor 48 in electronic communication with suitable temperature controller(s) 50. Where the device 10 is equipped with additional sensor(s) such as manifold output sensor 48, it is contemplated that the additional sensor(s) can be positioned proximate to target locations such as process fluid material outlet 42 in order to ascertain the temperature of the fluid material to be applied as it exits from the manifold device 36. Data obtained from manifold output sensor 48 can be processed based upon suitable defined operating parameters to control operation of the thermoelectric device(s) 38. Such data can be integrated with data derived from sensor 44 located proximate to the applicator nozzle 18 to produce govern operation of the thermoelectric device 38. Integration of such data can be accomplished by suitable mechanisms including, but not limited to suitable processing and computational devices such as CPU's and the like located on the device or remotely positioned but in electronic communication Where desired or required, it is also contemplated that the temperature control fluid can also be monitored by a suitable sensor such as temperature control fluid sensor 52, typically positioned proximate to the temperature control fluid outlet 39 from the manifold device 36. In the embodiment depicted in FIG. 1 temperature control fluid sensor 52 is positioned in the exit conduit. Where desired or required, the sensor can be positioned in the exit orifice defined in the heat transfer device 34. Data obtained from manifold output sensor can be processed based upon suitable defined operating parameters to control operation of the thermoelectric device 38. Such data can be integrated with data derived from sensor 44 located proximate to the applicator nozzle 18 to produce govern operation of the thermoelectric device 38.

It is contemplated that temperature controllers 22, 46, 50, etc., can be configured to provide suitable output signals actionable upon and controllable over the thermoelectric device 38 associated with manifold device 36. Where desired or required, the device 10 can include a suitable command and control system to coordinate and/or reconcile the temperature controller data and execute appropriate commands actionable on the thermoelectric device.

As used herein, "thermoelectric devices" are considered to be those devices that directly convert electric voltage into temperature differences by means of the thermoelectric effect. It is contemplated that the thermoelectric device can be a solid-state active heat pump devices that transfer heat from one side of the respective device to the other. Depending upon circumstances including current direction and/or orientation of the thermoelectric device 38, it is contemplated that thermal energy in the form of heat can be transferred away from the heat transfer device 34 or can be transferred to the heat transfer device 34 based upon data obtained from various locations including but not limited to the nozzle based sensor 44 associated with applicator nozzle 18, the outlet sensors such as manifold output sensor 48 and temperature control fluid sensor 52 as well as any combination of the same.

The thermoelectric device or devices 38 can be any suitable solid state device capable of producing a thermal effect upon application of electric current therethrough. The thermoelectric device or devices 38 can be configured to accommodate current reversal where desired or required. Thus the device can achieve positive or negative heat transfer relative to the heat transfer device 34 as a result of current reversal. One nonlimiting example of a suitable thermoelectric device is a peltier circuit device.

Figure 4:
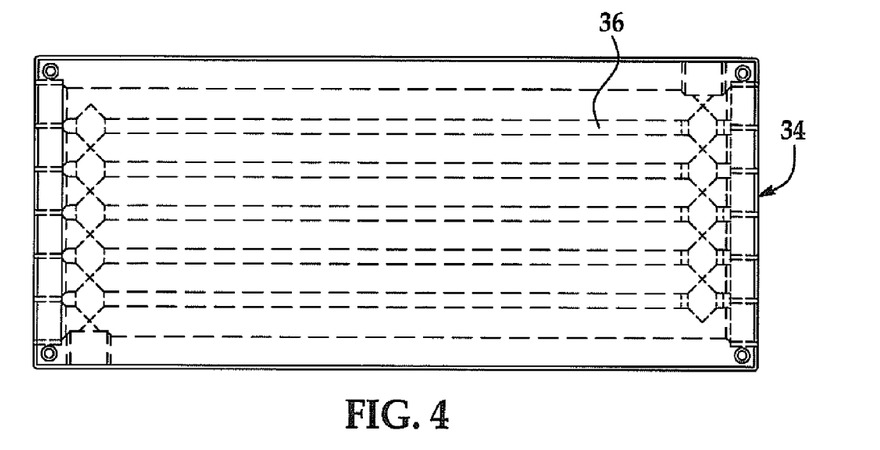
FIG. 4 is a plan view of an embodiment of thermal transfer manifold structure suitable for use in the embodiment of FIG. 1.
Figure 5:
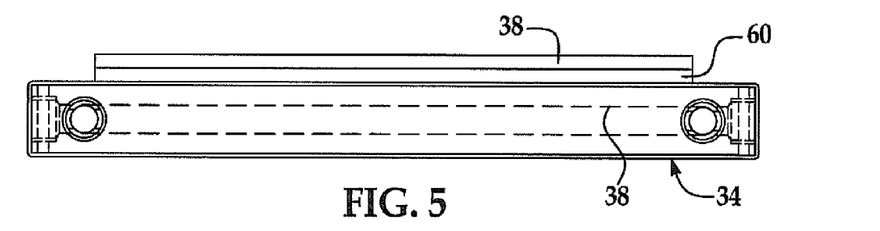
FIG. 5 is a longitudinal side view of the thermal transfer manifold structure of FIG. 4.
Figure 6:
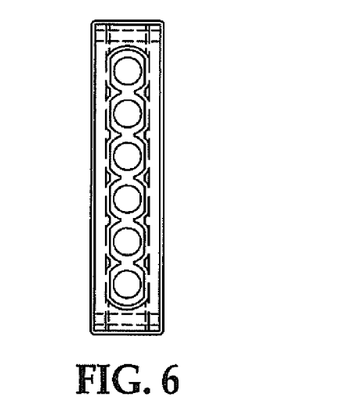
FIG. 6 is a latitudinal side views of the thermal transfer manifold structure of FIG. 4.

Thermoelectric device or devices 38 can be attached or affixed to the heat transfer device 34 by any suitable means. Attachment can be permanent or nonpermanent. One non-limiting example of attachment can be by embedding heat transfer device 34 proximate to an outer surface 35 of manifold device 36. It is also contemplated that suitable thermoelectric device(s) 38 can be embedded in suitable heat transfer and/or electroconductive material such as aluminum or the like, cast in suitable configurations such as sheets, and/or overlaid onto or otherwise affixed to a surface of manifold device 36 in an either permanent or nonpermanent configuration. One non-limiting example is depicted in FIG. 4 where the thermoelectric device 38 is affixed to the heat transfer device 34 in a layered relationship with a suitable intermediate layer 60.

In the embodiment as depicted in FIG. 2, the thermoelectric device 38 is configured as a single thermoelectric device positioned in ultimate thermal contact with both the temperature adjustment fluid and the process material to be dispensed. It is considered within the purview of this disclosure that the thermoelectric device 38 can be configured with any number of individual operating devices such as peltier circuits configured to operate in concert or individually as desired or required.

An alternate embodiment is depicted in FIG. 3 depicting a non-limiting example of an alternate configuration of heat transfer device 34, in which three individual peltier circuit devices such as circuit devices 53A, 53B, and 53C are shown associated with the portion of the manifold device 36 conveying temperature control fluid and two individual peltier circuit such as circuit devices 55A and 55B are shown associated with the portion of the manifold device 36 conveying the process material to be dispensed.

It is contemplated that the various individual peltier circuit devices such as circuit devices 53A, 53B, and 53C can be configured to provide thermal transfer characteristics that are independent of one another in various applications. Thus any number of peltier circuits device employed can have different ratings, outputs and configurations as desired or required. It is also contemplated that various the thermoelectric device 38 can be configured for the independent activation of various Peltier circuits as desired or required to achieve desired thermal transfer.

It is also contemplated that the device 10 can be configured with various auxiliary devices to assist in thermal transfer operations. They can include, but need not be limited to, suitable fans or other devices associated with the thermal transfer element configured to assist in or augment heat transfer operations (not shown).

Where desired or required, it is contemplated that the heat transfer device 34 can be configured as separate submanifolds as in FIG. 3. As depicted in FIG. 3, heat transfer device 34 has two submanifolds: temperature control fluid submanifold 54 and process material fluid manifold 56 that are associated with the material to be applied or the temperature control fluid respectively. In the submanifold configuration, it is contemplated that thermoelectric device(s) 38 will be configured to be affixed in thermal contact with at least one of the submanifolds. In the embodiment depicted in FIG. 3, the thermoelectric device 38 is composed of multiple different discrete peltier devices affixed in thermal contact to the respective submanifolds.

Where desired or required, it is contemplated that the respective submanifolds can be oriented in such a manner that the submanifolds are thermally insulated from one another. As used herein, the term "thermally insulated" is taken to mean that the thermal transfer between the respective submanifolds is impeded or prevented. This can be accomplished by any suitable means. In the embodiment set forth in FIG. 3, the heat exchange element includes at least one thermal insulation element such as thermal insulator 58 interposed between the respective submanifolds 54, 56. In this manner, it is contemplated that the respective peltier circuit devices can function independently of one another to provide appropriate temperature control for the respective materials passing through the associated portions of the heat transfer device 34.

The manifold device 36 portion of heat transfer device 34 can be configured as a single block or as a plurality of submanifolds as desired or required. The conduits defined in the heat transfer device 34 can have any internal diameter (ID) suitable to achieve conveyance of material therethrough. While achieving the desired thermal transfer characteristics and properties. Where desired or required the conduit conveying thermal transfer fluid can have an inner diameter that differs from the inner diameter of conduits conveying process material. As a non-limiting example, the ID of the thermal transfer fluid conduits may be ⅜ inch while the ID of the adhesive is ½ inch. The respective ID values will be that sufficient to achieve thermal transfer and fluid flow.

Similarly the number of passes through the heat transfer device 34 will be that sufficient to achieve desired thermal transfer. By way of non-limiting example, the thermal transfer fluid may be subject to three passes while the process material is subject to four or more passes.

Where desired or required, it is contemplated that multiple submanifolds can be employed to achieve desired specific heating of various materials passing therethrough. By way of nonlimiting example, it is contemplated that three manifolds can be added together to provide temperature adjustment for the temperature control fluid as well as various parts of a two or multipart polymeric blend.

The embodiment as depicted contemplates peltier circuit devices positioned on one face of the manifold device 36. It is within the purview of this invention to employ peltier circuit devices on multiple faces of the manifold device 36 as desired or required. Thus, it is contemplated that peltier circuit devices can be releasably or removably affixed to opposed sides of the manifold device 36 and can be activated and controlled based upon the output signals from at least one sensor such as sensor 44. Depending upon the orientation and positioning of the respective peltier circuit devices, it is contemplated that the manifold device can be heated or cooled as desired or required.

It is contemplated that the peltier circuit devices and associated substrate can be permanently attached to a manifold device 36 as desired or required. However, it is also within the purview of this disclosure to provide removable temperature control devices that can be affixed to the desired manifold. In this way, it is contemplated that specific manifolds can be switched out as desired or required.

It is contemplated that the associated thermal transfer device 34 of device 10 can be affixed or attached to any suitable location defined on the applicator mechanism. In various embodiments, it is contemplated that the heat transfer device 34 can be affixed to the movable arm of a suitable robotic device where desired or required. In this way, temperature control and regulation of material to be applied can be accomplished at a location proximate to the final output location.

It is contemplated that the device 10 disclosed herein permits the application of various fluid materials in a thermally controlled manner. The device 10 also permits the application of various thermally controlled materials at locations remote to any centrally located heat exchange device as could occur when various robotically mounted applicators are employed. The device disclosed herein also permits the effective application of thermally conditioned material in application devices that are configured with process material recirculation as well as those configured with deadhead applicators such as the one depicted in FIG. 1. It is also contemplated that the dual functional temperature control device can be employed to condition material that is applied in intermittent intervals.

Figure 7:
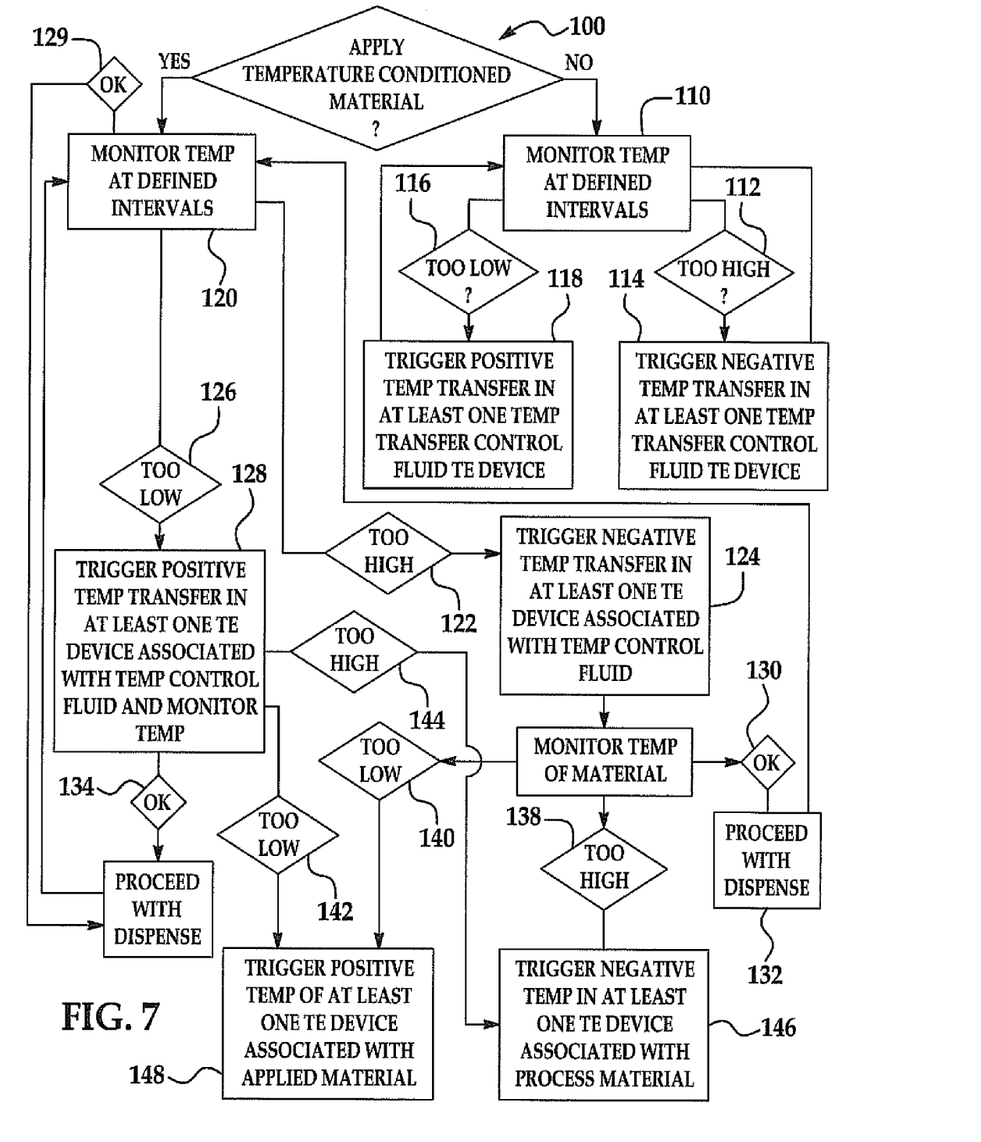
FIG. 7 is a process diagram depicting one application process flow possible with an embodiment of the device disclosed herein.

One non-limiting intermittent material application process is outlined in the process diagram set forth in FIG. 7. In the process outlined in FIG. 7, application material is delivered to a suitable deadheaded applicator nozzle 18 governed by suitable controls or logic to apply material in a suitable pattern. In various deadhead configurations, the logic can also include command and control features that govern the application of material in an intermittent pattern. This is generally depicted at reference numeral 100.

Before during and after material application, the temperature of the material at the applicator nozzle 18 can be monitored and measured against desired application temperature parameters that can be contained in and executed by suitable software as desired or required. In application situations governed by a "no" command, the temperature of material at or proximate to the applicator nozzle 18 can be monitored constantly or at desired intervals as at reference numeral 110. Based upon monitoring data, a temperature that deviates above the predetermined optimum temperature range triggers commands that result in one operation of at least the thermoelectric device 38 associated with the heat transfer device 34 to remove thermal energy from at least one circulating temperature control fluid. These steps are designated at reference numerals 112 and 114. Similarly, based upon monitoring data, a temperature that deviates below the predetermined optimum temperature range triggers commands that result in the operation of at least one thermoelectric device 38 associated with the heat transfer device 34 to introduce thermal energy into at least one circulating temperature control fluid. These steps are designated at reference numerals 116 and 118.

In application situations governed by a "yes" command, the temperature of material at or proximate to the applicator nozzle 18 can be monitored constantly or at desired intervals as at reference numeral 120. Based upon monitoring data, a temperature that deviates above the predetermined optimum temperature range triggers commands that result in the operation of at least one of the thermoelectric devices associated with the heat transfer element to remove thermal energy from at least one circulating temperature control fluid. These steps are designated at reference numerals 122 and 124. Similarly, based upon monitoring data, a temperature that deviates below the predetermined optimum temperature range triggers commands that result in the operation of at least one thermoelectric device associated with the heat transfer element to introduce thermal energy into at least the circulating temperature control fluid. These steps are designated at reference numerals 126 and 128. In either situation where suitable temperature conditioning has resulted, the process continues with future monitoring as required as at reference numerals 129, 130, 132, 134, and 136.

In either situation, the process also comprehends temperature conditioning of material to be dispensed through the nozzle applicator. It is considered within the purview of the present disclosure to monitor material temperature at the nozzle applicator and condition the temperature of material upstream in the heat transfer device 34 based upon temperature monitoring data. This can be done simultaneous to temperature control fluid conditioning or in any sequence relative thereto.

In the process depicted in FIG. 7, the monitoring as at reference numeral 120 subsequent to conditioning steps 124, 128 can result in the temperatures that deviate above or below the temperature parameters as at reference numerals 138, 140, 142, 144. Elevated nozzle temperature data trigger negative temperature transfer driven by at least one thermoelectric device associated with the material to be applied while the material is resident in the heat transfer element as at reference numeral 146. Similarly, depressed temperature reading can trigger operation of at least one thermoelectric device to transfer thermal energy to the material to be applied while resident in the heat exchange device as at reference numeral 148.

The above-mentioned embodiments have been described in order to allow easy understanding of the present invention. The invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed:

1. A temperature control system for dispensing a process fluid material from an applicator nozzle at a controlled temperature, the applicator nozzle having an applicator nozzle outlet orifice, said temperature control system comprising:
   at least one temperature control fluid conduit containing a liquid temperature control fluid;
   at least one process fluid material supply conduit;
   at least one manifold device, the at least one manifold device in communication with both the at least one temperature control fluid conduit and the process fluid material supply conduit, wherein the at least one temperature control fluid conduit projects from the at least one manifold device toward the applicator nozzle and the temperature control fluid recirculates from the at least one manifold device to a location proximate to the applicator nozzle and back to the at least one manifold device;
   at least one thermal adjustment device in thermal contact with the at least one manifold device, the thermal adjustment device including at least one peltier circuit device, wherein the at least one peltier circuit device associated with the thermal adjustment device is configured relative to the at least one manifold device to achieve cooling and wherein the thermal adjustment device is removably attachable to the at least one manifold device;
   at least one control device; and
   at least one sensor positioned proximate to the applicator nozzle outlet orifice, the at least one sensor producing at least one signal actionable on the at least one peltier circuit device, wherein the sensor provides output to the control device and is actionable on the at least one peltier circuit device;
   wherein the at least one manifold device has a central body, the central body defining at least one outer surface and at least one serpentine temperature control fluid channel defined in the central body, the at least one serpentine temperature control fluid channel being in fluid communication with the at least one temperature control fluid conduit and configured to convey the liquid temperature control fluid passing through the temperature control fluid conduit, the at least one manifold device further including at least one serpentine process fluid material channel in fluid communication with the process fluid material supply conduit and configured to convey the process fluid material passing through the process fluid material supply conduit, wherein the at least one serpentine temperature control fluid channel and the at least one serpentine process fluid material channel are in side-by-side relationship with one another; and
   wherein the serpentine temperature control fluid channel and the at least one serpentine process fluid material channel are defined in an outer body, wherein the at least one-peltier circuit device is positioned on the outer surface of the central body of the manifold device at a location proximate to the temperature control fluid channel defined therein, the temperature control system further comprising at least one additional peltier circuit device positioned on the outer surface of the manifold device proximate to the at least one serpentine process fluid material channel configured to convey fluid material defined in the manifold device.

2. The temperature control system of claim 1, wherein the at least one manifold device further comprises at least one thermal insulator disposed between the temperature control fluid channel and the process fluid material channel.

3. The temperature control system of claim 1, further comprising at least one additional sensor positioned in the process fluid material supply conduit that is located upstream of the sensor positioned proximate to the applicator nozzle.

4. The temperature control system of claim 1, wherein the applicator nozzle is located on an applicator and the at least one manifold device is located on an associated applicator device.

5. The temperature control system of claim 1, further comprising at least one jacket configured to releasably surround at least a portion of the process fluid material supply conduit at a location proximate to the applicator nozzle, the jacket containing at least a portion of the temperature control fluid conduit.

6. The temperature control system of claim 1, wherein the serpentine temperature control fluid channel has an inlet and an outlet configured to be in fluid communication with the at least one temperature control fluid conduit, the at least one manifold device also including at least one serpentine temperature control fluid channel.

7. The temperature control system of claim 1 wherein the at least one thermal adjustment device comprises a plurality of peltier circuit devices wherein at least one first peltier circuit device is positioned on the at least one thermal adjustment device at a location proximate to the at least one temperature control fluid conduit and at least one second peltier circuit device positioned proximate to the process fluid material channel.

8. The temperature control system of claim 7, wherein the at least one manifold device further includes a thermal insulation element interposed between the process fluid material channel and the temperature control fluid channel.

* * * * *